United States Patent [19]
Schmidt

[11] Patent Number: 5,572,240
[45] Date of Patent: Nov. 5, 1996

[54] CHART RECORDER

[75] Inventor: Dieter Schmidt, Nesselwang, Germany

[73] Assignee: Endress +Hauser Wetzer GmbH & Co. KG, Nesselwang, Germany

[21] Appl. No.: 512,513

[22] Filed: Aug. 8, 1995

Related U.S. Application Data

[63] Continuation of Ser. No. 106,058, Aug. 13, 1993.

[30] Foreign Application Priority Data

Aug. 14, 1992 [EP] European Pat. Off. .............. 92710023

[51] Int. Cl.$^6$ ................. G01D 9/00; G01D 9/04
[52] U.S. Cl. ................. 346/17; 346/34; 346/46
[58] Field of Search ................. 346/17, 34, 35, 346/44, 46; 400/83, 84

[56] References Cited

U.S. PATENT DOCUMENTS

| | | |
|---|---|---|
| 3,576,582 | 4/1971 | Smith, Jr. . |
| 3,596,284 | 7/1971 | Zaphiropoulos . |
| 3,971,041 | 1/1978 | Mason . |
| 4,067,017 | 1/1978 | Dertouzos et al. . |
| 4,222,057 | 9/1980 | Cuvelier . |
| 4,249,186 | 2/1981 | Edwards . |
| 4,382,262 | 5/1983 | Savit . |
| 4,405,931 | 9/1983 | Fujisawa . |
| 4,423,412 | 12/1983 | Flanagan .............. 340/661 |
| 4,433,388 | 2/1984 | Nakagawa et al. . |
| 4,583,100 | 4/1986 | Tazaki . |
| 4,654,672 | 3/1987 | Kimura et al. .............. 346/17 |
| 4,774,524 | 9/1988 | Warbus et al. . |
| 5,270,732 | 12/1993 | Kalteis et al. .............. 346/46 |

FOREIGN PATENT DOCUMENTS

| | | |
|---|---|---|
| 2422145 | 11/1979 | France . |
| 2908307 | 9/1980 | Germany . |
| 3004541 | 8/1981 | Germany . |
| 3004555 | 8/1981 | Germany . |
| 3112871 | 10/1982 | Germany . |
| 3227589 | 1/1984 | Germany . |
| 56-147010 | 11/1981 | Japan . |
| 57-118113 | 7/1982 | Japan . |
| 57-169616 | 10/1982 | Japan . |
| 58-204315A | 11/1983 | Japan .............. G01D 15/10 |
| 62-204972 | 2/1988 | Japan . |
| 3-420 | 1/1991 | Japan . |

Primary Examiner—Benjamin R. Fuller
Assistant Examiner—Craig A. Hallacher
Attorney, Agent, or Firm—Bose McKinney & Evans

[57] ABSTRACT

This chart recorder with n or m (n, m=1, 2, 3, . . . ) measuring channels, one for each of n or m measurement signals to be recorded, has a printing device (5) or m continuous-line recording devices (31, 32) which produces/produce n equal colored dot sequences (8), each associated with one of the n measurement signals, or continuous lines (8', 8") each associated with one of the m measurement signals, as measurement curves on a recording medium (4, 4') moving past it/them. Those portions (81; 81', 81") of the dot sequences or continuous lines which are currently being formed lie behind a covering portion (51, 51') formed by the printing device (5) or the continuous-line recording devices (31, 32) and/or by other components of the chart recorder, and are invisible. The chart recorder further includes an electronic display (21, 21') with p lines each consisting of q dots on which the dot-sequence or continuous-line portions (81; 81', 81") currently being formed are displayed as corresponding electronic dot sequences (80, 80', 80").

4 Claims, 6 Drawing Sheets

Fig. 3
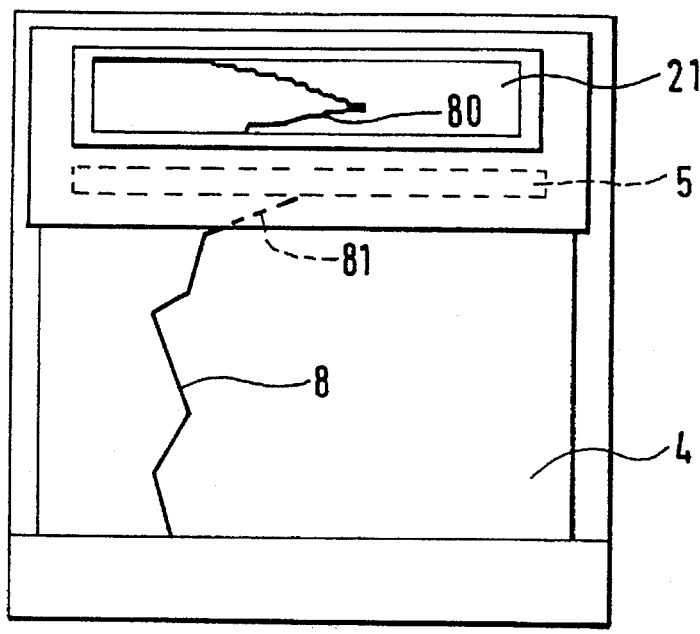
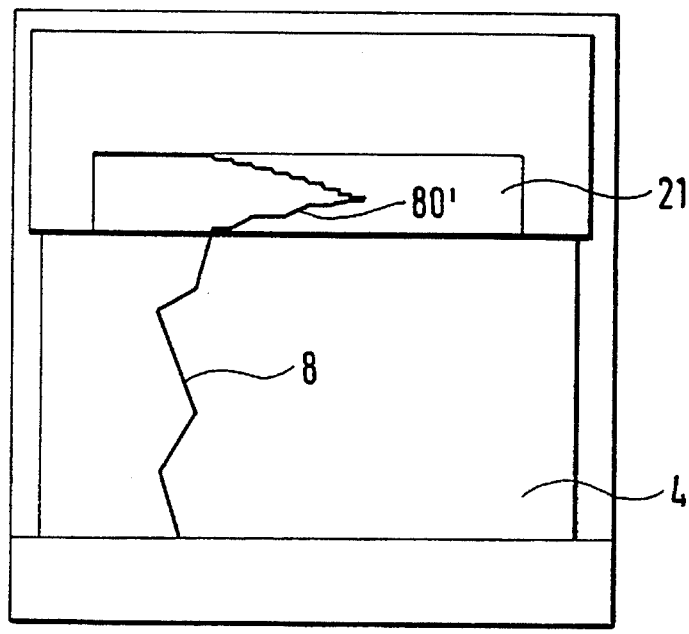
Fig. 4

CHART RECORDER

This is a continuation of application Ser. No. 08/106,058, filed Aug. 13, 1993.

The priority of European Patent Application No. 92 71 0023.0 of Aug. 14, 1992, is claimed.

FIELD OF THE INVENTION

The present invention relates to chart recorders comprising measuring channels, preferably a plurality thereof, wherein currently forming portions of measurement curves being produced on a moving recording medium lie behind a covering and are thus invisible until the portion of the recording medium with the currently forming curve portions has left the covering.

BACKGROUND OF THE INVENTION

For example, in a chart recorder with a so-called thermal comb whose heating elements, which are arranged along a straight line and fixed, are activated by the measurement signal and produce a measurement curve on heat-sensitive recording paper used as a recording medium, the curve portions currently being formed are covered by the thermal comb and are therefore invisible.

Also, for design or aesthetic reasons, the housing of a chart recorder may be so designed that the curve portions currently being formed disappear behind a covering and are therefore invisible.

The design and use of thermal combs in chart recorders are also described in U.S. Pat. No. 3,971,041.

Such a chart recorder with a thermal comb is, for example, the recorder being produced and sold by the applicant under the name of "MEGA-LOG", in which one to six measuring channels are provided, one for each of the measurement signals to be recorded. The thermal comb consists of a plurality of point heat sources which are arranged side by side along the width of the recording paper and are constantly in contact with the latter. To produce the dot sequence associated with a measuring channel, a short current pulse is applied to the point heat sources for each dot.

Jap. Publctn. JP-A 62-204 972 discloses a typewriter wherein the characters currently being written on the keyboard and thus printed on the typewriting paper are also made visible line by line on an electronic alphanumeric display to immediately display the characters being hidden by the printing mechanism or other parts of the typewriter.

Thus, this facility is only designed to additionally visualize the alphanumeric characters deliberately and intentionally produced by the writer, i.e., characters whose information content is already known to the writer.

By contrast, those portions of the above-mentioned dot sequences of chart recorders which are currently being formed contain nonalphanumeric information which is not yet known to the viewer and is frequently of the greatest interest to him, e.g., information on whether and at what rate measurement signal changes, i.e., what its trend is at the measurement time and in the vicinity thereof. Because of the covering, however, this possibly very important information is accessible only with a delay.

The problem underlying the invention is to eliminate this disadvantage.

SUMMARY OF THE INVENTION

In a first solution, claimed in claim 1, there is provided a chart recorder comprising n (n=1, 2, 3, . . . ) measuring channels, one for each of n measurement signals to be recorded, a printing device which produces n equal-colored dot sequences, each associated with one of the n measurement signals, as measurement curves on a recording medium moving past it, those portions of the dot sequences which are currently being formed lying behind a covering portion formed by the printing device and/or by other components of the chart recorder, and being invisible, and an electronic display with p lines each consisting of q dots on which the dot-sequence portions currently being formed are displayed as corresponding electronic dot sequences.

In a second solution, claimed in claim 2, there is provided a chart recorder comprising m (m=1, 2, 3, . . . ) measuring channels, one for each of m measurement signals to be recorded, m continuous-line recording devices which each produce a continuous line associated with one of the m measurement signals as a measurement curve on a recording medium moving past them, those portions of the continuous lines which are currently being formed lying behind a covering portion formed by the continuous-line recording devices and/or by other components of the chart recorder, and being invisible, said continuous-line recording devices being movably guided past each other on parallel guides perpendicular to the direction of movement of the recording medium, and an electronic display with p lines each consisting of q dots on which the continuous-line portions currently being formed are displayed in time-corrected form as corresponding electronic dot sequences.

A first development of the first solution comprises 1 to n writing devices for 1 to n different colors which overwrite or underwrite one or more of the dot sequences, at least in sections, with a continuous line of another one of the n colors which follows the measurement signal of the respective channel.

A second development of the first solution comprises a color-printing device for 1 to n different colors which marks selected dots of each measurement curve with dots of another one of the n colors.

These two developments are described for chart recorders per se in applicant's U.S. patent application Ser. No. 07/673, 017, which is incorporated herein by reference.

Both solutions of the invention and the two developments of the first solution may preferably be improved by implementing the electronic dot sequences on the display in the form of a light-dark or dark-light border.

Furthermore, both solutions of the invention and the two developments of the first solution may preferably be improved by fixing the display to the covering portion in such a way that the visible dot sequences or lines are continued on the display by electronic dot sequences congruent with the dot-sequence or line portions currently being formed.

In a preferred embodiment and development of the second solution, the display is fixed to the covering portion in such a way that the visible dot sequences or lines are continued on the display by electronic dot sequences congruent with those portions of said dot sequences or lines which are currently being formed, and there is provided at least one electronic buffer in which are stored signals from at least one measurement channel and from an additional measurement channel serving as a reference channel which correspond to the currently forming portions of the lines, and from which said signals are read for presentation on the display at such times that the electronic dot sequences on the display originate from a zero time line which is congruent with that of the reference channel.

BRIEF DESCRIPTION OF THE DRAWINGS

The invention will become more apparent from the following description of embodiments taken in conjunction with the accompanying drawings, in which like parts are designated by like reference characters, and wherein:

FIG. 3 is a schematic front view of the chart recorder of FIG. 1;

FIG. 4 is a schematic front view of a preferred embodiment of the chart recorder of FIG. 3;

DETAILED DESCRIPTION OF THE DRAWINGS

To simplify the illustration, FIGS. 1 to 7 show the application of the invention to the recording of a single measurement signal; i.e., the above-mentioned consecutive number is one. FIG. 8 illustrates the recording of two measurement signals, i.e., the above-mentioned consecutive number m is two. The figures show only those parts of the chart recorder which are essential for the invention and an understanding thereof. In FIG. 8, the covering parts have been omitted for the sake of clarity.

Figure 1:
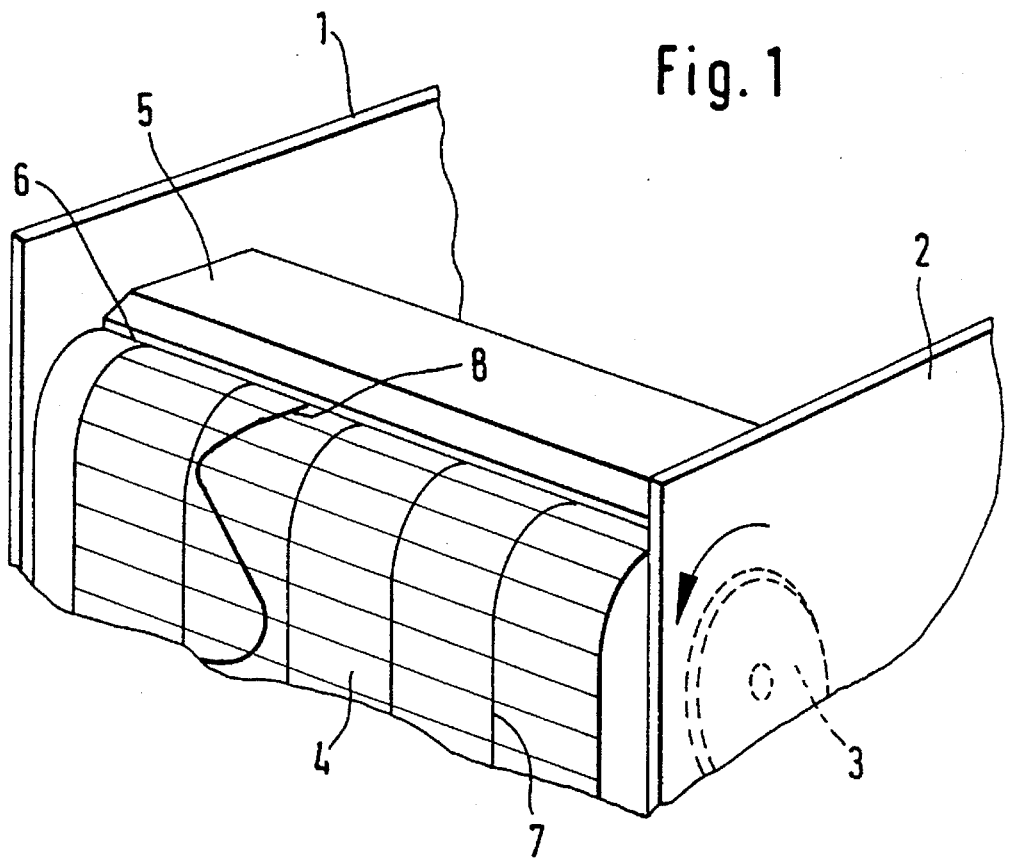
FIG. 1 shows a part of a chart recorder with a thermal comb which is essential for the invention.

The chart recorder of FIG. 1 has two end plates 1, 2, between which the other parts are accommodated and which also serve to support and hold these parts. The latter include a print roller 3, over which a recording medium 4 in the form of a heat-sensitive paper is pulled, e.g., by rotating the print roller 3 in the direction of the arrow. Mounted above the print roller 3 is a printing device 5 in the form of a thermal comb of the kind mentioned above, whose closely spaced point heat sources 6 are shown in the figures as a continuous line.

The printing device 5 produces on the recording medium 4 both a regular pattern of lines 7 and, in response to a measurement signal, a dot sequence 8, whose dots are spaced so closely in FIG. 1 that they are shown as a continuous line.

Figure 2:
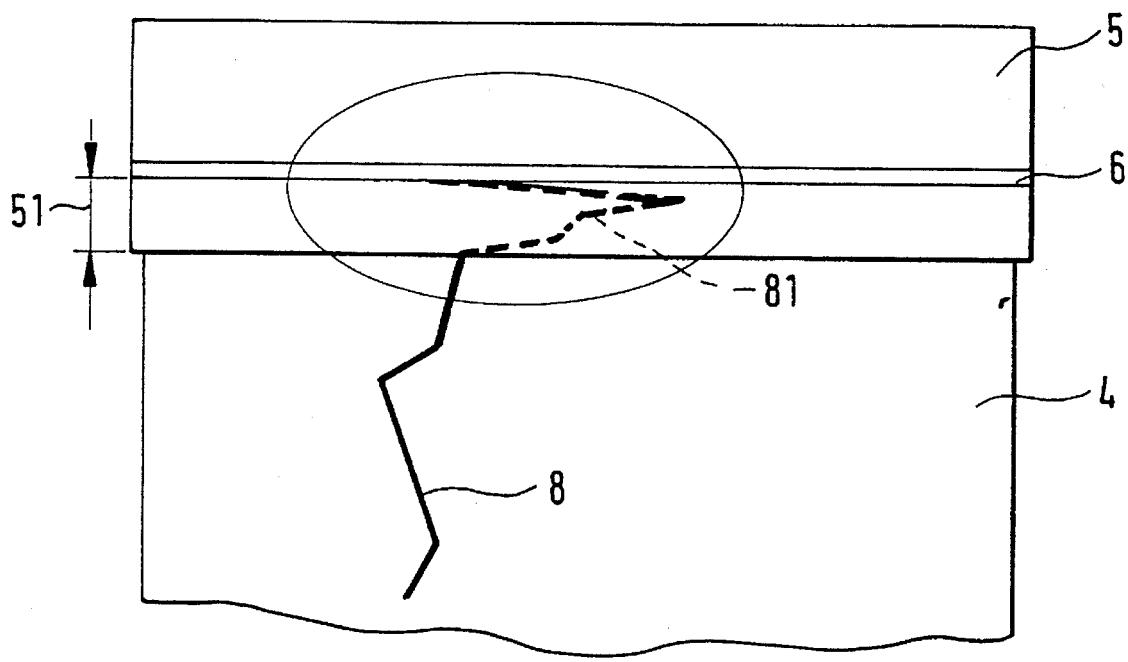
FIG. 2 shows schematically a part of FIG. 1 serving to explain the problem underlying the invention.

The above-explained problem is apparent from the highly schematic FIG. 2: Between the line of the point heat sources 6 and its front edge, where the dot sequence 8 becomes visible for the first time, the thermal comb of FIG. 1, acting as the printing device 5, has a covering portion 51, behind which portions 81 of the measurement curve which are currently being formed are hidden, cf. the ellipse serving to indicate this area.

The highly schematic front view of FIG. 3 illustrates the fundamental idea of the invention. It shows how and that those portions 81 of the dot sequence 8 which are currently being formed are made visible despite being covered: Above the covering portion 51, a display 21 with p lines of q dots each is fixed on which those portions 81 of the dot sequence 8 which are currently being formed are displayed as a corresponding, preferably congruent, electronic dot sequence 80.

The highly schematic front view of FIG. 4 shows a preferred embodiment of the fundamental idea of the invention: The display 21 is fixed to the covering portion 51 in such a way that the visible dot sequence 8 is continued on the display 21 by an electronic dot sequence 80' congruent with those portions 81 of this dot sequence which are currently being formed.

In the embodiment of FIG. 5, which again shows a highly schematic front view of a chart recorder, the electronic dot sequences 80 and 80' on the displays 21 of FIGS. 3 and 4, respectively, are implemented in the form of a light-dark or dark-light border 82. Therefore, a dark stripe similar to a so-called bar graph appears on the display 21 which extends from left to right and corresponds in width to the number p of lines, and whose dark-light border 82 represents the electronic dot sequence 80. If necessary, it is also possible, of course, to provide the dark stripe in the right-hand portion of the display 21.

Particularly suitable displays are commercially available liquid crystal displays (LCDs) or vacuum-fluorescent displays (VFDs), such as the two-line, 20-digit 5×7 dot VFD with the number FIP20X2CA of NEC. All other types of matrix displays with graphics capability can also be used, of course.

Figure 5:
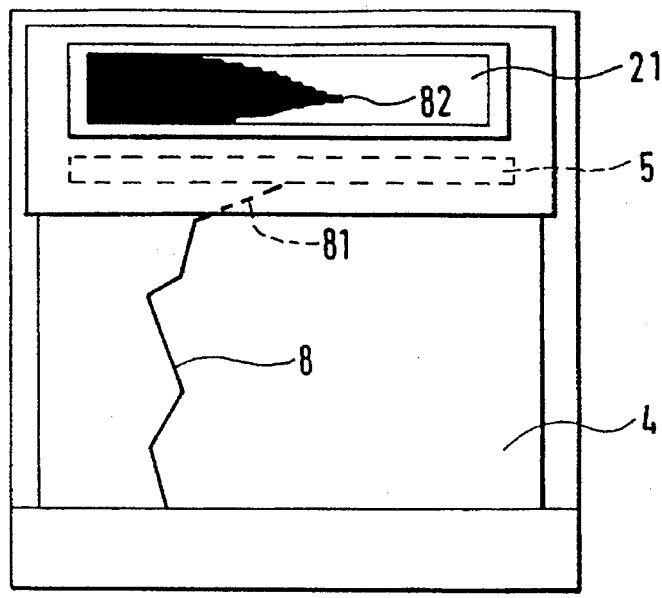
FIG. 5 is a schematic front view of a variant of the chart recorder of FIG. 3.
Figure 6:
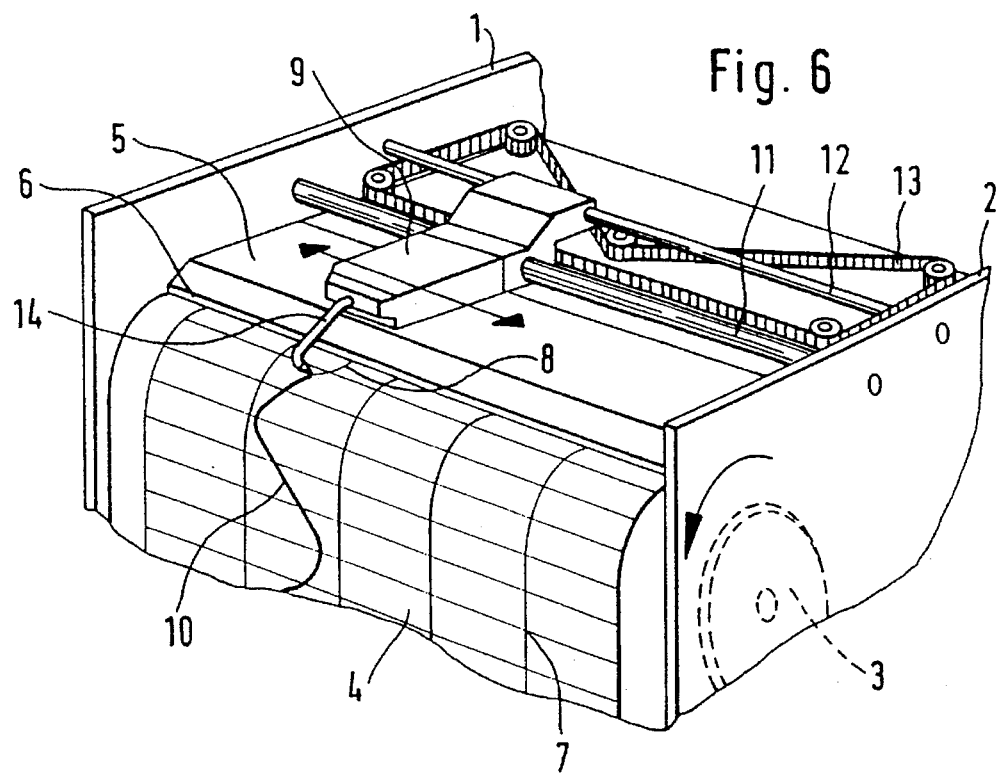
FIG. 6 shows a part of a first development of the novel chart recorder which is essential for the invention.

In FIG. 6, which shows a part of a first development of a chart recorder equipped with a display according to FIG. 1 or any one of FIGS. 3 to 5 and in which the display is not shown to simplify the illustration, there is provided one of n writing devices 9 for n different colors which overwrites or underwrites the dot sequence 8 with a continuous line 10 of one of these colors.

The horizontal double-headed arrow indicates that the writing device 9 is movably supported and guided by means of two bars 11, 12 over the entire width of the recording medium 9. The horizontal drive is effected via a timing belt 13, which passes over the toothed rollers shown, at least one of which is motor-driven. Sliding over the recording medium is a pen 14, which is connected with an ink supply, so that the line 10 overwriting the dot sequence interconnects the dots.

Figure 7:
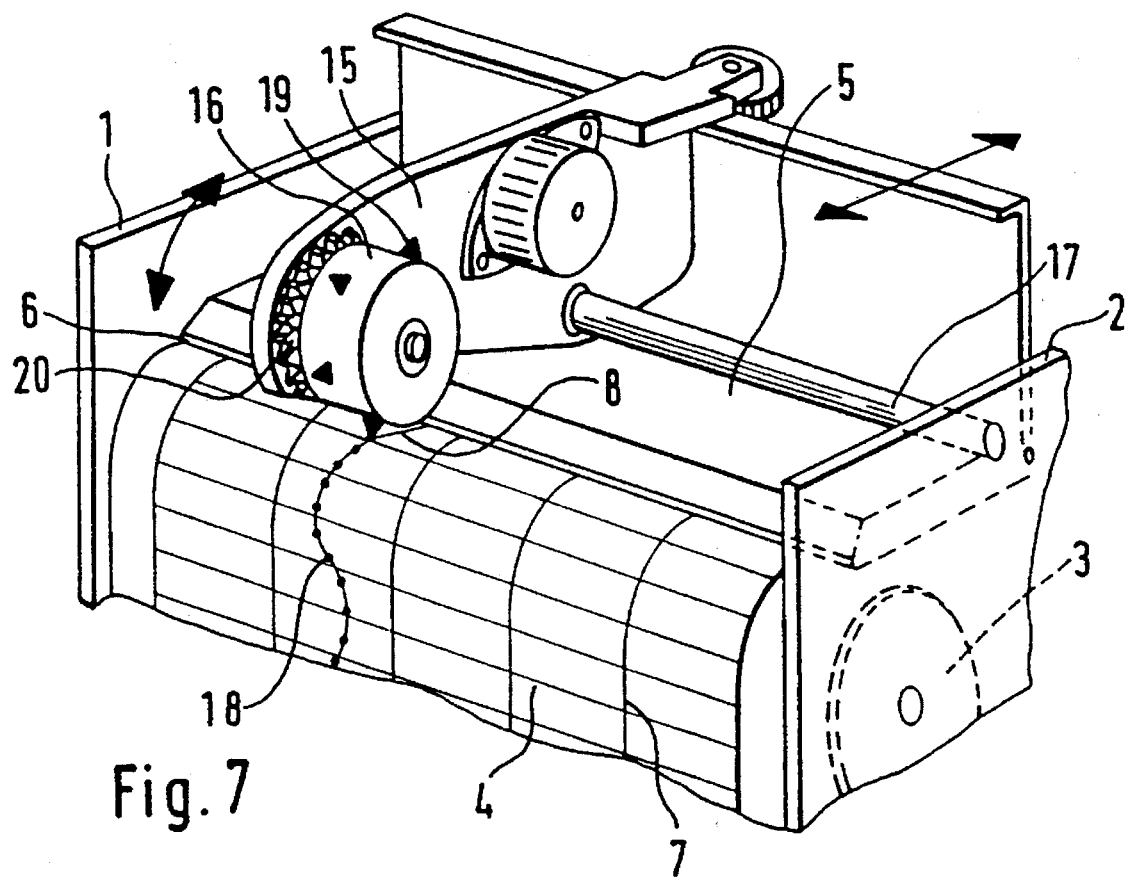
FIG. 7 shows a part of a second development of the novel chart recorder which is essential for the invention.
Figure 8:
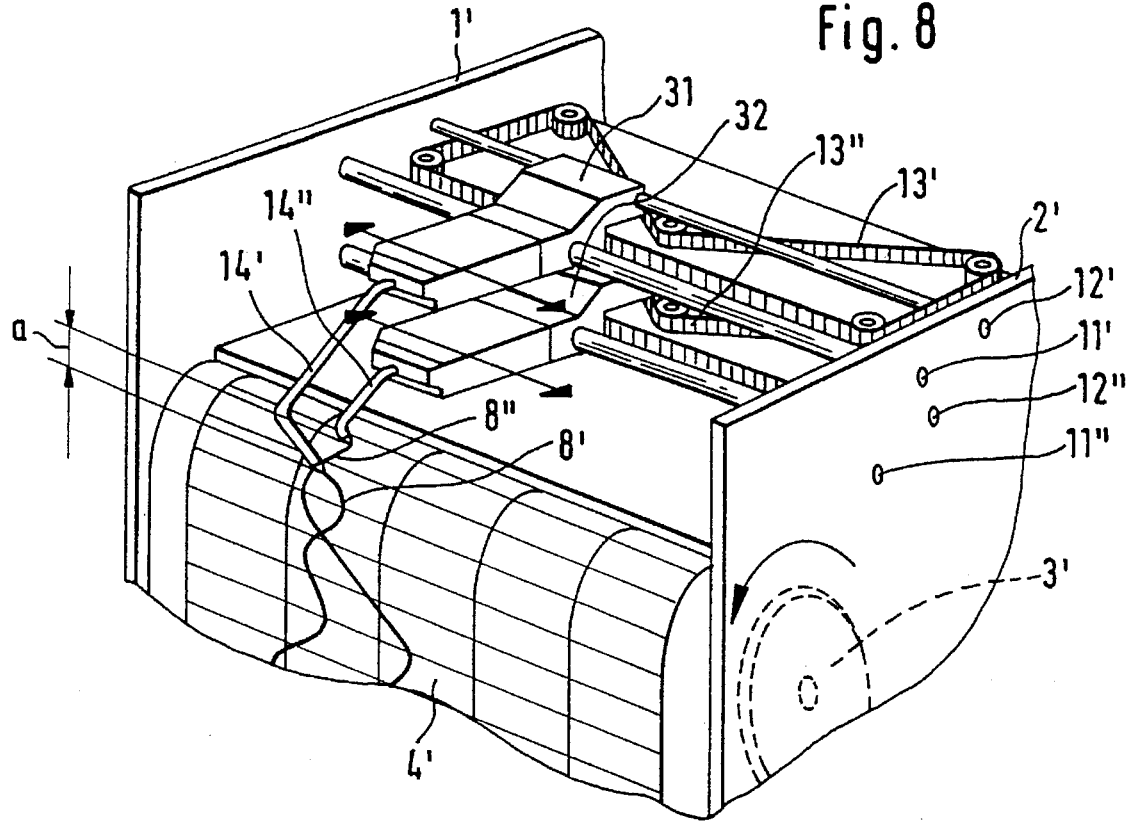
FIG. 8 shows a part of a chart recorder with continuous-line recording devices which is essential for the invention.

In FIG. 7, which shows a part of a second development of a chart recorder equipped with a display according to FIG. 1 or any one of FIGS. 3 to 5 and in which the display has again been omitted to simplify the illustration, a color-printing device 15 is provided instead of the writing device 9 of FIG. 5. It comprises a print wheel 16 and is rotatably and slidably supported on a shaft 17. By backward and forward movement, the print wheel 16 can be positioned and then placed on and lifted from the recording medium 4, so that the dot sequence 8, which is again produced by the point heat sources 6 of the printing device 5, can be marked with color dots 18.

The lateral surface of the print wheel 16 is provided with n ink nibs 19 each of which gives off a color different from those of the others. The print wheel 16 further has a gear rim 20, via which the respective ink nibs 19 can be brought to a position in which the color dots 19 are printed on the recording medium 4. In FIG. 5, this is the position in which one of the ink nibs 19 is vertically above the recording medium 4.

Thus, according to these two developments of the invention, the chart recorders with color discrimination of the dot sequences as described in the above-mentioned U.S. patent application Ser. No. 07/673,017 can also be fitted with the display in accordance with the invention.

The chart recorder shown in FIG. 8 has two continuous-line recording devices 31, 32; hence, the above consecutive number m is two. The chart recorder comprises two end plates 1', 2', between which the other parts are accommodated and which also serve to support and hold these parts. The latter include a print roller 3', over which a recording medium 4' in the form of, e.g., a raster or heat-sensitive paper is pulled, e.g., by rotating the print roller 3 in the direction of the arrow.

Above the print roller 3', the two continuous-line recording devices 31, 32 are arranged to be movable past each other over the entire width of the recording medium 4', as indicated by the two horizontal double-headed arrows. To this end, each of the two continuous-line recording devices is guided on a pair of parallel bars 11', 12' and 11", 12", respectively, which are fixed in the two end plates 1', 2'.

The horizontal drive is effected via timing belts 13', 13", which pass over the toothed rollers shown, at least one of which is motor-driven. Sliding over the recording medium 4' are two pens 14', 14", which are connected to one ink supply each, so that two lines 8', 8" are produced, one for each of the two measurement signals.

Due to the mechanical construction and particularly to the fact that the continuous-line recording devices are freely movable past each other, a reading problem arises in such chart recorders since on the recording medium, dots corresponding to equal instants of the measurement signals are not assigned a single time reference line, as would be practical for optimum reading. The two lines 8', 8" have a vertical time offset z which is proportional to their vertical spacing a and inversely proportional to the feed rate v of the recording medium: $z=a/v$.

The use of the display in accordance with the invention makes it possible to correct this time offset and to it zero on the display, i.e., to cause all the m electronic dot sequences to originate from a common zero time line.

Figure 9:
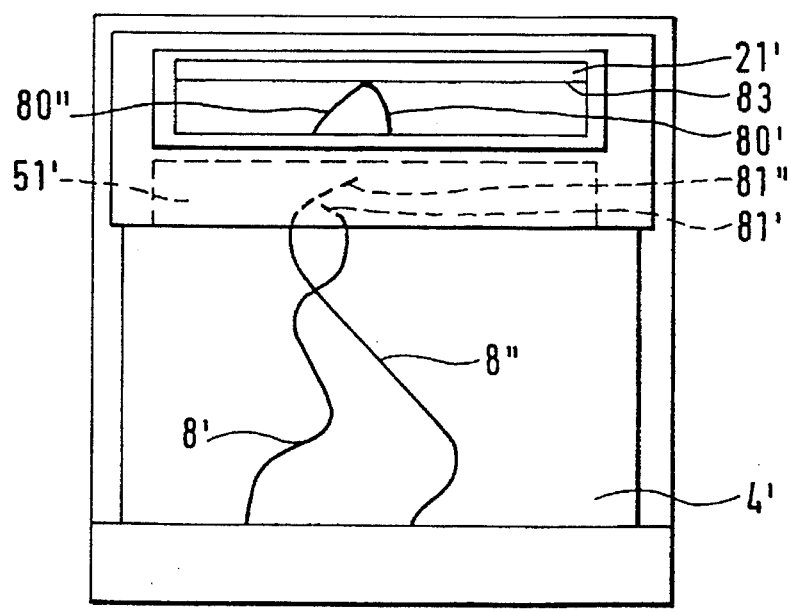
FIG. 9 is a schematic front view of the chart recorder of FIG. 8.

The result is apparent from FIG. 9. In the highly schematic front view of FIG. 9, the fundamental idea of the invention is illustrated as applied to continuous-line recording devices according to FIG. 8. Like FIG. 3, FIG. 9 shows how and that those portions 81', 81" of the lines 8', 8" which are currently being formed are made visible despite being covered: Fixed above the covering portion 51' is a display 21' with p lines each consisting of q dots on which those portions 81', 81" of the dot sequence which are currently being formed are displayed as corresponding, preferably congruent, electronic dot sequences 80', 80", time-corrected with respect to the common zero time line 83.

This time correction can advantageously be implemented with a circuit as is described in principle in U.S. Pat. No. 4,222,057 and illustrated in the block diagram of FIG. 10, which applies for the case of the two measuring channels assumed by way of example in FIG. 9 but can be readily expanded for further measuring channels.

The measuring channels associated with the continuous-line recording devices 31 and 32 will hereinafter be referred to as the first and second, respectively. The respective, generally analog signal from any type of sensor, such as a pressure, temperature, volumentric-flow, mass-flow, pH-value or gas-concentration sensor, is applied to the inputs E1 and E2 of the first and second measuring channels, respectively.

In the first measuring channel, the signal is converted from analog to digital form in an analog-to-digital converter 41 and fed to the continuous-line recording device 31 undelayed. In the second (and every further) measuring channel, the signal, after being converted from analog to digital form in an analog-to-digital converter 42, is first fed to an electronic buffer 60, where it is delayed by the above-mentioned time offset z before being applied to the continuous-line recording device 32.

The (undelayed) output signal from the analog-to-digital converter 41 and the output signal from the buffer 60 are also applied to the input of a code converter 61, which generates the signals necessary to drive the display 21' from the digitized measurement signals.

The timing of the overall circuit and the adaptation to the above-mentioned feed rate v of the recording medium 4' via a print roller driver circuit 3' are accomplished via a microprocessor 70, which has a clock oscillator 90 associated with it.

Figure 10:
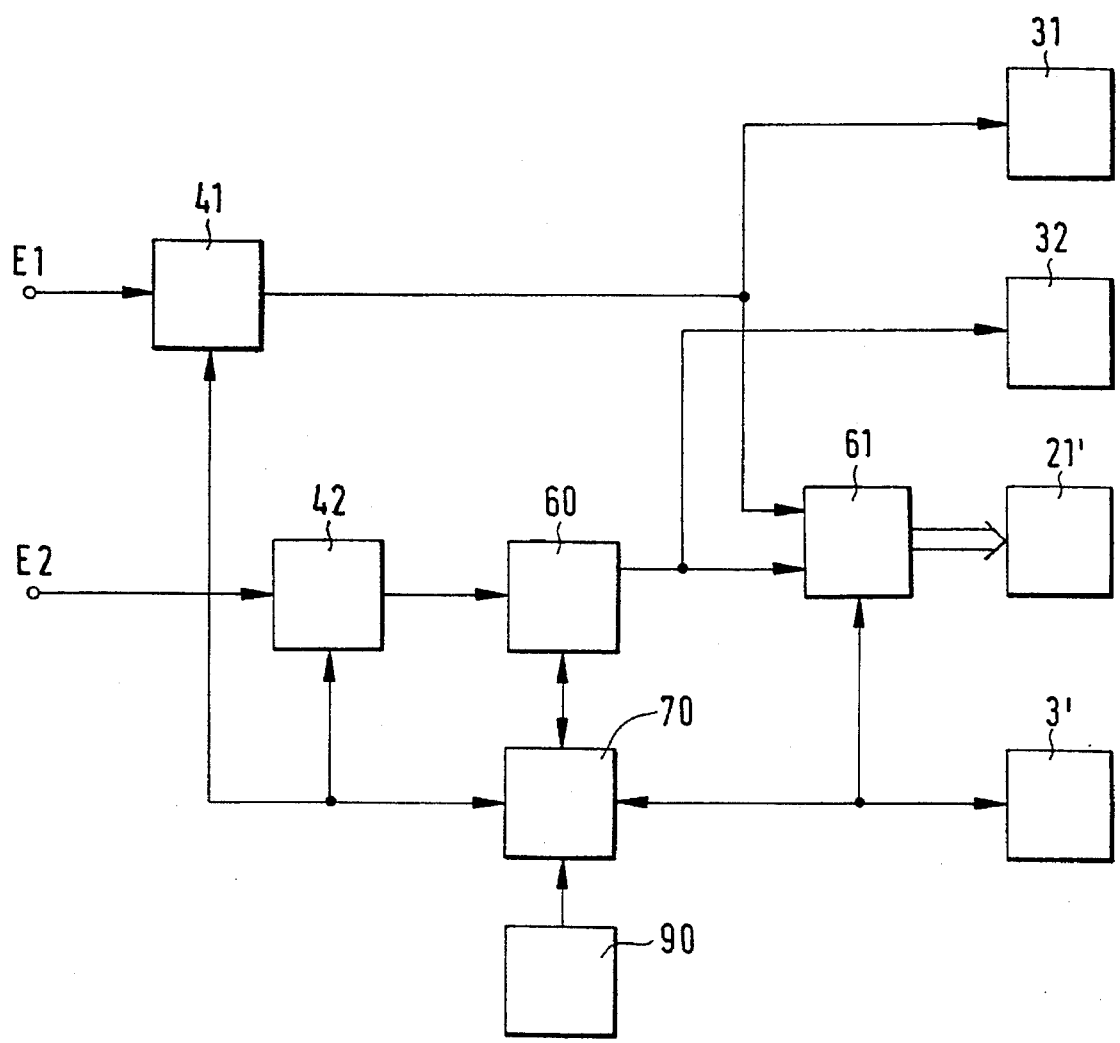
FIG. 10 is a block diagram of the electronic subcircuits of the chart recorder of FIG. 8 which are essential for the invention.

The circuit of FIG. 10 requires that the continuous-line recording devices 31, 32 are equipped with stepping motors which are directly controllable by digital signals to impart the two-and-fro motion along the parallel guides 11', 12', 11", 12". In cases where analog signals are needed for this purpose, the signals to be fed to the continuous-line recording devices 31, 32 have to be converted back to analog signals by means of suitable digital-to-analog converters.

The use of the electronic buffer 60 makes it possible to achieve such an indication on the display 21' that the electronic dot sequences 81', 81" originate from the common zero time line 83.

If more than two measuring channels are provided, it is advantageous to feed all output signals from the analog-to-digital converters to the buffer. Then, any of the measuring channels can be used to determine the zero time line.

I claim:

1. A chart recorder comprising:

means for producing n, n=1, 2, 3, . . . measurement signals to be recorded, n measuring channels, one for each of said n measurement signals to be recorded, a moveable recording medium, a printing device (5) having a covering portion and producing n equal-colored dot-sequences (8), each of said dot-sequence being associated with one of the n measurement signals, as measurement curves on the moveable recording medium as the recording medium (4) moves past the printing device, the printing device producing the dot-sequences on the recording medium at a location in the printing device that lies behind the covering portion (51) of the printing device of the chart recorder, such that the producing dot-sequences are not visible at a time the dot-sequences are produced, and an electronic visual display (21) with p lines each consisting of q dots on which the non-visible dot-sequences currently being produced are displayed as corresponding electronic dot-sequences (80) prior to the produced dot-sequences on the moveable medium being moved to a visible portion of the chart recorder wherein the dot sequences produced by the display and the dot sequence produced by the printing device are in a same pattern and formatted with a dark and light border portion.

2. A chart recorder as claimed in claim 1, comprising 1 to n writing devices (9) for 1 to n different colors which overwrite or underwrite one or more of the dot-sequences (8), at least in sections, with a continuous-line (10) of another one of the n colors which follows the measurement signal of the respective measuring channel.

3. A chart recorder as claimed in claim 1, comprising a color-printing device (15) for 1 to n different colors which marks selected dots of each measurement curve with dots (18) of another one of the n colors.

4. A chart recorder comprising:

means for producing m, m=1, 2, 3, . . . measurement signals to be recorded, m measuring channels, one for each of said m measurement signals to be recorded, a moveable recording medium, m continuous-line recording devices (31, 32) having a covering portion, the recording devices producing a continuous-line (8', 8") associated with each one of the m measurement signals as a measurement curve on the recording medium (4') as the recording medium moves past the continuous-line recording devices, the continuous-line recording devices producing the continuous-lines on the moveable recording medium as the moveable recording medium is moved to a location in the continuous-line recording device that lies behind the covering portion (51') of the continuous-line recording devices of the chart recorder, such that the produced continuous-lines are not visible at the time they are produced, said continuous-line recording devices being movably guided past each other on n parallel guides (11', 12'; 11", 12") that extend perpendicular to the direction of movement of the recording medium, and an electronic visual display (21') with p lines each consisting of q dots on which display portions of the continuous-lines currently being produced are displayed in time-corrected form as corresponding electronic dot-sequences (80', 80") prior to the non-visible produced continuous-lines on the moveable medium being moved to a visible portion of the chart recorder wherein the dot sequences produced by the display and the dot sequence produced by the printing device are in a same pattern and formatted with a dark and light border portion.

* * * * *